United States Patent [19]
Hale

[11] Patent Number: 5,822,489
[45] Date of Patent: Oct. 13, 1998

[54] LOW REFRACTIVE INDEX PHOTO-CURABLE COMPOSITION FOR WAVEGUIDE APPLICATIONS

[75] Inventor: Arturo Hale, New York, N.Y.

[73] Assignee: Lucent Technologies, Inc., Murray Hill, N.J.

[21] Appl. No.: 775,541

[22] Filed: Dec. 31, 1996

[51] Int. Cl.$^6$ .................................................. G02B 6/22
[52] U.S. Cl. ........................ 385/145; 372/6; 385/127; 522/6
[58] Field of Search ................................ 385/123, 126, 385/127, 141, 144, 145; 372/6; 522/6

[56] References Cited

U.S. PATENT DOCUMENTS

| | | | |
|---|---|---|---|
| 5,024,507 | 6/1991 | Minns et al. | 385/145 |
| 5,239,026 | 8/1993 | Babirad et al. | 385/145 X |
| 5,373,576 | 12/1994 | Minns et al. | 385/126 X |
| 5,484,822 | 1/1996 | Minns | 522/35 |
| 5,616,638 | 4/1997 | Hallden-Abberton et al. | 385/123 X |
| 5,652,821 | 7/1997 | Okumi et al. | 385/145 |

*Primary Examiner*—John D. Lee

[57] ABSTRACT

A clad optical fiber comprising a core and a cladding made of a material having a refractive index smaller than that of the core, wherein the cladding is made of a cured material comprising a perfluoropolyether or perfluorohydrocarbon backbone end capped with (meth)acrylate groups via urethane groups.

49 Claims, 3 Drawing Sheets

LOW REFRACTIVE INDEX PHOTO-CURABLE COMPOSITION FOR WAVEGUIDE APPLICATIONS

FIELD OF THE INVENTION

The present invention relates to low refractive index photo-curable materials based on fluorinated urethane acrylates.

BACKGROUND OF THE INVENTION

Most optical fibers consist of a doped or undoped glass core surrounded by a doped or undoped glass cladding. However, there are several cases in which it may be advantageous to use a polymeric material as cladding instead of siliceous glass. Polymeric materials are flexible, so they do not break as easily when the fiber is bent. Additionally, the refractive index of polymers can be made much lower than the achievable by doping silica with fluorine or boron. A lower index can provide a larger numerical aperture, thereby increasing the acceptance angle for the incoming radiation. U.S. Pat. No. 4,511,209 and European Pat. No. 0 333 464 B1 disclose polymer compositions suitable for use as cladding for optical fibers.

Other devices that require low refractive index coatings are optical fibers lasers and amplifiers (cladding pumped lasers) such as those described in co-assigned U.S. patent application Ser. No. 08/561,682 (now abandoned) and in U.S. Pat. No. 4,815,079. These devices comprise a doped silica core, a doped or undoped glass cladding, and an outer polymer cladding. The core is pumped by a laser guided through the inner (glass) cladding; the outer (polymer) cladding has an even lower refractive index so that the combination inner/outer cladding can act as a waveguide.

The process currently used to coat glass fibers with polymers comprises applying a UV-curable formulation with a die. Acrylate-functional formulations are the most widely used coating materials because of their extremely fast curing rates, ease of synthesis and commercial availability. To achieve the low refractive index required for the aforementioned applications, it is necessary to employ fluorinated coatings. However, commercially available fluorinated acrylates have viscosities that are too low for a standard die-coating application. One way to circumvent this problem has been disclosed in U.S. Pat. No. 5,024,507, which describes the use of a fluorinated polymer as a "viscosity modifying agent" in the UV-curable formulation.

It is an object of the present invention to provide an easily synthesizable low refractive index photo-curable composition with a viscosity suitable for coating optical fibers and with good mechanical properties such as toughness in the cured state.

SUMMARY OF THE INVENTION

The present invention relates to a composition having a low refractive index which is a photo-curable coating and is suitable for use as a cladding for optical waveguides. The coating of the instant invention is based on a fluorinated backbone end-capped with (meth)acrylate groups via urethane bonds. The fluorinated backbone provides the low refractive index, whereas the hydrogen bonding from the urethane bonds provides both high viscosity in the liquid coating and mechanical strength in the cured coating. The coating formulation can optionally have up to about 70 wt % of a fluorinated (meth)acrylate monomer, and up to about 50 wt % of a di- or multi- functional (meth)acrylate which may or may not contain fluorinated moieties. In addition, the formulation contains between 0.1 and 8 wt % photoinitiator, and it may contain other additives such as antioxidants and adhesion promoters. The coatings of the present invention have refractive indices ranging from about 1.37 to 1.41.

DETAILED DESCRIPTION OF THE INVENTION

The present invention more specifically comprises a composition based on an oligomer with the following general formula:

$$X\text{—}O\text{—}C(O)\text{—}NH\text{—}R^1\text{—}NH\text{—}C(O)\text{—}R^2\text{—}C(O)\text{—}NH\text{—}R^3\text{—}NH\text{—}C(O)\text{—}O\text{—}Y$$

where X and Y are independently or where v is an integer from 1 to 10, r is an integer from 1 to 10, and $1 \leq t \leq 3$.

$R^1$ and $R^3$ are independently, linear, branched or cyclic alkylene of from four to twenty carbon atoms that may be optionally substituted with groups such as aromatic rings or $R^1$ and $R^3$ independently are optionally substituted arylene groups;

$R^2$ is a fluorinated carbon-based chain with a fluorine content between about 25% and about 70% by weight. Examples of suitable $R^2$ structures include —O CH$_2$CF$_2$O(CF$_2$CF$_2$O)$_p$(CF$_2$O)$_q$CF$_2$CH$_2$O— and

—O CH$_2$CH(OH)CH$_2$OCH$_2$CF$_2$O(CF$_2$CF$_2$O)$_p$(CF$_2$O)$_q$CF$_2$CH$_2$CH(OH)CH$_2$O—

—O—CH$_2$—(CF$_2$)$_i$—CH$_2$—O— in which $3 \leq i \leq 20$
where $0 \leq n \leq 5$, $0.2 \leq p/q \leq 5$, and the actual values of p and q are such that the molecular weight of $R^2$ is between 500 and 10,000 and wherein the repeating fluorinated ether groups may be random or block repeating units.

$R^4$, $R^5$, $R^6$, $R^7$ and $R^8$ are independently hydrogen, methyl, ethyl or propyl.

In a preferred embodiment, both X and Y are

—CH$_2$—CH$_2$—O—C(O)—CH=CH$_2$, $R^1$ and $R^3$ are the isophorone residue, the molecular weight of $R^2$ is between 1,300 and 3,300, the average value of n is 1.5, and $0.8 \leq p/q \leq 1.25$.

The synthesis of the above oligomers can be described by the following scheme:

$$H-R^2-H + 2\ OCN-R^1-NCO \longrightarrow OCN-R^1-NH-C(O)-R^2-C(O)-NH-R^1-NCO$$

$$OCN-R^1-NH-C(O)R^2-C(O)-NH-R^1-NCO + 2HO-CH_2CH_2-O-C(O)-CH=CH_2 \longrightarrow$$

$$CH_2=CH-C(O)O-(CH_2)_2OC(O)NH-R^1-NHC(O)R_2-C(O)-NH-R^1NHC(O)O(CH_2)_2OC(O)CH=CH_2$$

It has further been found that a preferred material for coating of optical fibers is a material having an elastic modulus of at least about 12 MPa measured at a strain rate of 0.1 %/min. at room temperature (23° C.). In a more preferred embodiment, the material used for coating the optical fibers has an elastic modulus of greater than about 30 MPa measured at a strain rate of 0.1%/min. at room temperature (23°). The modulus value depends upon the rate of the measurement. The modulus values reported in this paragraph would change to 53 MPa and 120 MPa, respectively, if the measurement strain rate is 100%/min. Unless otherwise noted, the modulus values in this document were measured at 0.1%/min. strain rate.

It might be noted that a material having an elastic modulus of less than 12 MPa (at 0.1 %/min. strain rate) can be employed to coat optical fibers if the coated optical fiber is subsequently coated with a tougher material to provide a desired level of handleability.

Examples of fluorinated diols for the urethane backbone include:
$HO(CH_2CH_2O)_nCH_2CF_2O(CF_2CF_2O)_p(CF_2O)_qCF_2CH_2O(CH_2CH_2O)_nH$
$HO\ CH_2CF_2O(CF_2CF_2O)_p(CF_2O)_qCF_2CH_2OH$
$\{HOCH_2CF(CF_3)O[CF(CF_3)CF_2O]_2C_2F_4\}_2$ and an example of a tetrafunctional diol is:
$HO\ CH_2CH(OH)CH_2OCH_2CF_2O(CF_2CF_2O)_p(CF_2O)_qCF_2CH_2CH(OH)CH_2OH$ The urethane oligomers of the general formula shown above can be used alone or optionally in admixture with up to 70% by weight, preferably up to 35% by weight, of a fluorinated(meth)acrylate monomer or mixture of monomers and up to 50 weight %, preferably up to 35% by weight, of a di- or multi-functional (meth)acrylate which is optionally fluorinated. The possible additive materials include, for example 1H, 1H, 7H-dodeca-fluoroheptyl acrylate (DFHA), perfluoro-cyclohexylmethyl acrylate (PFCHMA), octafluoro hexanediol diacrylate (OFHDDA).

Examples of monofunctional fluorinated (meth)acrylates include:
2-(N-butyl perfluorooctanesulfonamido)ethyl acrylate
2-(N-butyl perfluorooctanesulfonamido)ethyl methacrylate
2-(N-ethyl perfluorooctanesulfonamido)ethyl acrylate
2-(N-ethyl perfluorooctanesulfonamido)ethyl methacrylate
1,1-dihydroheptafluorobutyl acrylate
1,1-dihydroheptafluorobutyl methacrylate
1,1-dihydroperfluorooctyl acrylate
1,1-dihydroperfluorooctyl methacrylate
1H, 1H, 7H-dodecafluoroheptyl acrylate
1H, 1H, 7H-dodecafluoroheptyl methacrylate
1H, 1H, 11H eicosafluoroundecyl acrylate
1H, 1H, 11H eicosafluoroundecyl methacrylate
1H, 1H, 2H, 2H-heptadecafluorodecyl acrylate
1H, 1H, 2H, 2H-heptadecafluorodecyl methacrylate
1H, 1H, 9H-hexadecafluorononyl acrylate
1H, 1H, 9H-hexadecafluorononyl methacrylate
1H, 1H, 5H-octafluoropentyl acrylate
1H, 1H, 5H-octafluoropentyl methacrylate
perfluoroheptoxy poly(propyloxy)acrylate
perfluoroheptoxy poly(propyloxy)methacrylate
$C_4F_9OCF(CF_3)CF_2OCF(CF_3)CH_2OC(O)CH=CH_2$
$CF_3O(CF_2CF_2O)_p(CF_2O)_qCF_2CH_2O-C(O)CH=CH_2$
$CF_3O(CF_2CF_2O)_p(CF_2O)_qCF_2CH_2O(CH_2CH_2O)_n-C(O)CH=CH_2$
perfluorocyclohexylmethyl acrylate
perfluorocyclohexylmethyl methacrylate Examples of hydroxyfunctional acrylates include:
$CH_2=CH-C(O)O-CH_2CH_2OH$
$CH_2=CH-C(O)O-CH_2CH(CH_3)OH$
$CH_2=CH-C(O)O-CH_2CH_2CH_2CH_2OH$
$CH_2=CH-C(O)O-CH_2CH(CH_2CH_3)OH$
$CH_2=CH-C(O)O-CH_2CH_2O-[C(O)(CH_2)_5-O-]_2-H$
$CH_2=CH-C(O)O-[CH_2CH_2O_n-H$
triacrylate:
$[CH_2=CH-C(O)O-CH_2]_3C-CH_2OH$ Examples of difunctional acrylates include:
2,2,3,3,4,4,5,5-octafluorohexanediol-1,6-diacrylate
perfluorocyclohexyl-1,4-dimethyl diacrylate
polyperfluoroethyleneglycol diacrylate
2,2,3,3-tetrafluoro-1,4 butanediol diacrylate
hexafluoropentandiyl-1-5 bis(acrylate)
hexafluorobisphenol "A" diacrylate
$CH_2=CHC(O)OCH_2CF_2O(CF_2CF_2O)_p(CF_2O)_qCF_2CH_2OC(O)CH=CH_2$
$\{CH_2=CHC(O)OCH_2CF(CF_3)O[CF(CF_3)CF_2O]_2C_2F_4\}_2$ A preferred embodiment of the present invention comprises a coating composition which is photocurable or E-beam curable and which has a viscosity of between about 1000 and 100,000 cP at 23° C.; a refractive index of the cured material lower than 1.390 (at 633 nm and 23° C.); a glass transition temperature greater than 30° C.; an elastic modulus at 23° C. greater than 30 MPa (measured at a strain rate of 0.1%/min) or greater than 120 MPa (measured at a strain rate of 100%/min); an elongation at break greater than 20%; and a tensile strength greater than 8 MPa (at 100%/min). The present preferred coatings are distinguished by having all of the above listed properties. Usually, coatings which are hard don't meet the present elongation requirement and tend to have low viscosities. In addition, such coatings tend to be brittle. In the past coatings having the desired viscosity property are not very hard. The present preferred coatings meet all of the above properties. Photocurability, viscosity and refractive index are indispensable properties. In order that the coating can be the sole polymeric coating on a fiber, the coating needs to meet the above listed glass transition temperature, elastic modulus, elongation at break and tensile strength properties. If the latter four properties are not satisfied, the polymer-clad fiber can be jacketed or overcoated with another protective polymer layer.

The present invention further comprises a cladding pumped laser for a high-power fiber laser. It relies on a multi-mode (pump) cladding for accepting and transferring pump energy to an active core along the length of the device through the core-clad interface. Energy is guided within the pump cladding by a second cladding of a lower index of refraction. The configuration is useful in fiber amplifiers as well as in fiber lasers.

The structure of the configuration comprises a centrally-positioned single mode core within a multimode pump cladding. The pump cladding forms an interface with a second cladding. A third cladding forms a more nearly circular interface with the second cladding. A preferred triple-clad structure, can comprise a silica-based glass core, a pump clad and a second clad, all enveloped by an organic polymeric third clad.

A double-clad structure is also possible which consists of a core and first cladding, both generally of silica-based glass, and final polymeric cladding forming an interface with the inorganic glass structure.

These structures provide for containment of energy in the pump cladding. This function is served by the second glass cladding layer together with polymeric cladding such as the present urethane acrylates with the two forming the interface. The claddings are of successively lower refractive index than pump cladding.

A glass-polymer interface offers an operating advantage. Its differential index of refraction may be far greater than permitted between silica-rich compositions that differ only in minor dopant content. The coatings of the present invention which are fluorinated urethanes have indices which are especially useful in these structures.

Unless otherwise indicated, use of the term "cladding" is intended to connote (low index) guiding layers, and is not intended to include protective coatings of higher index than that of underlying material.

Effective operation of the cladding pumped laser depends on collection area. Whether a double or triple-clad structure, outer claddings serve for accepting and transferring introduced energy into the pump clad, and are a part of the collection area. Enhanced energy transfer is due to the pump cladding. The thickness of outer claddings is, accordingly, minimized and that of the pump cladding maximized commensurate with other considerations.

The diisocyanates useful in the present invention include trimethylene diisocyanate, tetramethylene diisocyanate, hexamethylene diisocyanate, pentamethylene diisocyanate, 1,2-propylene diisocyanate, 2,3-butylene diisocyanate, 1,3-butylene diisocyanate, 2,4,4- or 2,2,4-trimethylhexamethylene diisocyanate, dodecamethylene diisocyanate, 1,8-diisocyanatooctane and 2,6-diisocyanatomethyl caproate, cycloalkylene diisocyanates, such as 1,3-cyclopentane diisocyanate, 1,4-cyclohexane diisocyanate, 1,3-cyclohexane diisocyanate, isophorone diisocyanate, $OCN-CH_2-CH(CH_3)C(CH_3)_2CH_2CH_2-NCO$, $OCN-CH_2-C(CH_3)(CH_3)CH(CH_3)CH_2CH_2-NCO$. 3-isocyanatomethyl-3,5,5-trimethylcyclohexyl isocyanate, 4,4'-methylenebis(cyclohexyl isocyanate), methyl-2,4-cyclohexane diisocyanate, methyl-2,6-cyclohexane diisocyanate, 1,2-bis (isocyanatomethyl)cyclohexane, 1,4-bis(isocyanatomethyl)cyclohexane, 1,3-bis(isocyanatomethyl)cyclohexane, and trans-cyclohexane-1,4-diisocyanate, aromatic diisocyanates, such as m-phenylene diisocyanate, p-phenylene diisocyanate, 4,4-diphenyl diisocyanate, 1,5-naphthalene diisocyanate, 4,4-diphenylmethane diisocyanate, 2,4- or 2,6- tolylene diisocyanate, 4,4'-toluidine diisocyanate, dianisidine diisocyanate, 1,3-bis(1- isocyanato-1-methylethyl)benzene and 4,4'-diphenyl ether diisocyanate, araliphatic diisocyanates, such as ω,ω'-diisocyanato-1,3-dimethylbenzene, ω,ω'-diisocyanato-1,4-dimethylbenzene, ω,ω'-diisocyanate-1,4-diethylbenzene, α,α,α',α'-tetramethyl-m-xylylene diisocyanate and α,α,α',α'-tetramethyl-p-xylylene diisocyanate. The polyisocyanate can be used alone or in combination of two or more thereof.

A solvent may optionally be used for preparing the present urethanes and, if any solvent is used, it is preferable to use one which is inert to the above described diisocyantes.

Illustrative solvents which can be used include ethyl acetate, butyl acetate, methyl ethyl ketone, dimethylformamide, 1,1,2-trichlorotrifluoroethane and tetrahydrofuran.

A catalyst can optionally be employed for promoting the urethane formation reaction.

Illustrative catalysts include organic tin compounds such as tin octylate or dibuty-tin dilaurate, or tertiary amines such as N-methylmorpholine or triethyl amine.

The instant compositions can be cured by radiation or by thermal means. The radiation curing can be carried out by particle radiation of an electron beam or ionization, or a chemical beam such as ultraviolet rays. Photopolymerization is a preferred curing means in the presence of a photoinitiator.

Example of photo-polymerizing initiator specifically include

R is $C_4H_9$ or iso-$C_4H_8$,

Trigonal 121 (manufactured by Azo Co.), Darocure 1664 (manufactured by E. Merck Co.), Ultracure DRX (Sherwin-Williams Co.) and TBA (manufactured by BASF Co.), etc.

The details of the present invention are illustrated in the following examples.

EXAMPLE 1

0.54 g BHT (polymerization inhibitor) was dissolved in 87.3 ml isophorone diisocyanate (IPDI) under a dry air purge. After a few minutes, 0.26 ml dibutyl tin dilaurate (DBTDL) (catalyst) was added. The mixture was heated to 50° C. 250 ml Fomblin Fluorolink-E (Ausimont) was slowly added under dry air and constant agitation. The structure of Fluorolink-E is depicted below:

$$HO-(CH_2-CH_2-O)_N-(CF_2-CF_2-O)_p-(CF_2O)_q-(CH_2-CH_2-O)_N-H$$

where n~1.5, $0.8 \leq p/q \leq 1.25$, and the molecular weight is approximately 2100.

The temperature of the reacting mixture was raised to 70° C. After 2 hours, 49.2 ml hydroxyethyl acrylate was added. The reaction was allowed to proceed for 16 hours. Completion of the reaction was confirmed by the disappearance of the NCO infrared peak at 2270 $cm^{-1}$.

The oligomer synthesized as described in Example 1 has a very high viscosity; it is almost a solid at room temperature. This viscosity drops with temperature, so a viscosity appropriate for using this material as a coating for optical fibers can be achieved by heating the coating to 50°–80° C. An alternative way to achieve the proper viscosity is by blending this oligomer with low viscosity monomers. If the monomer used is difunctional, a high modulus material will be obtained upon cure. On the other hand, the use of monofunctional monomers will produce lower modulus, rubbery coatings. The refractive index of the cured oligomer is approximately 1.38 at room temperature and 633 nm. This index can be slightly increased or decreased according to the refractive index of the monomer added.

In order to improve the adhesion of this coating to glass, an alkoxysilane functionality can be incorporated into the oligomer as described in co-assigned U.S. patent application No. 08/774,562, filed Dec. 31, 1996 entitled CURABLE COATINGS WITH IMPROVED ADHESION TO GLASS. Thus, a certain percent of the oligomer molecules will consist of amphifunctional molecules with a (meth)acrylate on one end and an alkoxysilane on the other end. These amphiphilic molecules work as coupling agents tying the glass substrate to the coating polymer network.

The following examples illustrate the synthesis of the oligomer containing the alkoxysilane coupling agent and the effect of different monomers and different compositions on the viscosity, modulus and refractive index.

EXAMPLE 2

0.54 g BHT (polymerization inhibitor) was dissolved in 87.3 ml isophorone diisocyanate (IPDI) under a dry air purge. After a few minutes, 0.26 ml dibutyl tin dilaurate (DBTDL) (catalyst) was added. The mixture was heated to 50° C. 250 ml Fomblin Fluorolink-E (Ausimont) was slowly added under dry air and constant agitation. The temperature of the reacting mixture was raised to 70° C. After 2 hours, 7.2 ml aminopropyl-trimethoxysilane was added. This amount corresponds to 10% of the available isocyanate reactive groups. The amine group reacts with the isocyanate group to form a urea linkage. The reaction was allowed to proceed for 16 hours. Then, 44.3 ml hydroxyethyl acrylate was added. The reaction was allowed to proceed for 7 hours. Completion of the reaction was confirmed by the disappearance of the NCO infrared peak at 2270 $cm^{-1}$. The product consists of about 81% of the diacrylated oligomer, and about 18% of amphifunctional (acrylate—alkoxysilane) oligomer.

EXAMPLE 3

The product from Example 2 was mixed with 1% Darocur 1173 and different amounts of 1H,1H,7H-dodecafluoroheptyl acrylate (DFHA), perfluorocyclohexylmethyl acrylate (PFCHMA), octafluoro hexanediol diacrylate (OFHDDA), eicosafluoroundecyl acrylate (EFUA), or FX-189 (2-N-butylperfluorooctanesulfonamide) ethylacrylate supplied by 3M). The following table shows the elastic modulus and index of refraction for UV-cured films with these compositions. The data were taken at 23° C.

TABLE 1

Properties of the oligomer from example 2 blended with different materials and UV-cured

| COMPOSITION | MODULUS (MPa) | REFRACTIVE INDEX |
| --- | --- | --- |
| 100% oligomer | 38.0 | 1.380 |
| 14% DFHA | 9.5 | 1.378 |
| 25.5% DFHA | 4.0 | 1.376 |
| 20% PFCHMA | 13.8 | 1.380 |
| 30% PFCHMA | 6.4 | 1.380 |
| 7% OFHDDA | 45 | 1.383 |
| 14% OFHDDA | 66 | 1.388 |
| 30% FX-189 |  | 1.386 |
| 23% FX-189 + 23% EFUA |  | 1.379 |

The preceding table shows that the elastic modulus can be significantly improved by using difunctional monomer such a OFDDA. However, the refractive index using this monomer is slightly higher. On the other hand, a lower index can be achieved by using a monomer with a higher percent of fluorination (such as DFHA), but the elastic modulus is lower because the use of the monomer decreases the crosslink density.

EXAMPLE 4

The oligomer from Example 2 was blended with different amounts of DFHA. The following table gives the viscosities of the blend at room temperature (Brookfield viscometer, 20 rpm).

TABLE 2

Viscosity of different oligomer/monomer blends at room temperature

| WT % DFHA | VISCOSITY (cP) |
| --- | --- |
| 14.4 | 51,000 |
| 22.4 | 12,300 |
| 23.9 | 8,000 |
| 25.0 | 6,900 |
| 30.0 | 4,300 |

The elastic modulus of the cured films is somewhat higher if the alkoxysilane described in Example 2 is not used, because a higher crosslink density can be achieved.

EXAMPLE 5

The oligomer from Example 1 was blended with 1 wt % Darocur 1173 and 14% octafluorohexanediol diacrylate. The elastic modulus of cured films at 23° C. is about 80–120 MPa The refractive index is 1.388. Another way to increase the modulus of the coating is to endcap the oligomer with a polyfunctional acrylate. This is illustrated in the following example:

EXAMPLE 6

0.027 g BHT was dissolved in 4.36 ml IPDI. The mixture was heated to 50° C. under dry air. 0.02 g dibutyltindilaurate was added, and then 12.5 ml Fluorolink E was gradually added. The temperature was raised to 90° C. and maintained for 2.5 hours. Afterwards, 2.6 ml pentaerythritol triacrylate (PETA) was added gradually and allowed to react for one hour. Then 1.23 ml hydroxyethyl acrylate was added and allowed to react for 1.5 hours at 95° C.

The reacting mixture was then cooled down to 70° C. and allowed to finish reacting overnight. The resulted oligomer had about half of its chain-ends capped with monofunctional acrylate and half end-capped with a trifunctional acrylate.

EXAMPLE 7

The oligomer from Example 6 was mixed with 1 wt % Darocur 1173 and then UV-cured. The resulting film had an elastic modulus of 45 MPa and a refractive index of 1.390 at 23° C.

EXAMPLE 8

The formulation from Example 5 was coated on a glass fiber and UV-cured. Several hundred meters of fiber were drawn. The resulting fiber has a hard, tough coating. This plastic-clad fiber acts as a waveguide; not too much scattering was observed when launching a HeNe laser into this fiber.

Another approach taken in the present invention consists of developing a low refractive index coating that is hard and tough enough to provide adequate mechanical protection to the glass fiber. One way to increase the modulus of a coating is to increase the crosslink density. As shown above, this can be done by adding a di-functional acrylate such as octafluoro-hexanediol diacrylate, or multifunctional acrylate. A possible drawback to this approach is that the addition of OFHDDA can increase the refractive index.

It is possible to add, besides OFHDDA (high crosslink density), a very low index monomer such as pentadecafluoroheptylmethyl acrylate (PDFHMA) in order to keep the refractive index down. However, this monomer may be detrimental to the modulus. Hence, a fine balance must be achieved between modulus and refractive index. It is also feasible to add, in addition to OFHDDA, a very low index difunctional acrylate. For example, a diacrylated perfluoroether (L-9367, supplied by 3M) can be added to lower the index of formulations containing OFHDDA, without affecting the modulus too much. However, these formulations may be somewhat hazy. The following table shows some results on cured films using these approaches. The base formulation comprises the oligomer from Example 1 (above) and 1% Darocur 1173.

TABLE 3

| % OFHDDA | % PDFHMA | % L9367 | modulus (MPa) | refractive index |
|---|---|---|---|---|
| 19 | 5 | 0 | 107 | 1.3884 |
| 17.1 | 7.4 | 0 | 71 | 1.3847 |
| 18 | 4.7 | 5.25 | | 1.384 |
| 19 | | 9 | 78.5 | 1.3831 |

Another approach for obtaining a high modulus coating without paying a high refractive index penalty is to add a component that will contribute towards a high glass transition temperature. This component should have a low refractive index and should be able to react into the (meth)acrylate network.

Suitable materials are highly fluorinated rigid molecules with (meth)acrylate functionality. The rigidity in the molecule is typically achieved by the presence of carbon rings with four to eight ring members, or by bicyclic or multicyclic structures. The rings can be aromatic or aliphatic, but the latter are preferred because of their lower refractive index. In addition, the methacrylate functionality provides a higher rigidity than the acrylate functionality.

Examples of rigid (monofunctional) (meth)acrylates include:
perfluorocyclohexylmethyl methacrylate
pentafluorobenzyl(meth)acrylate
pentafluorophenyl(meth)acrylate
perfluoronorbornylmethyl(meth)acrylate
1H-perfluoroisobornyl(meth)acrylate -continued A preferred compound for this application is perfluorocyclohexylmethylmethacrylate. When homopolymerized, this material has a glass transition temperature in excess of 100° C. Therefore when this material is copolymerized with the urethane-acrylate coating, it will raise the glass transition of the overall formulation. If the glass transition is raised to a value above room temperature, a significant gain in room temperature modulus can be achieved. On the other hand, since this material is monofunctional it will lower the crosslink density; therefore one should not add too much of this material. Besides, methacrylates are slower to react than acrylates, so if cure speed is an issue, the methacrylate concentration should not be too high.

EXAMPLE 9

The oligomer synthesized as described in Example 1 (above) was mixed with different amounts of 2,2,3,3,4,4,5,5,-octafluoro-1,6,hexanedioldiacrylate (OFHDDA) and perfluorocyclohexylmethylmethacrylate (PFCHMMA), as shown in the following table. Darocur 1173 was added to each formulation (1 wt %), and flat rectangular films were UV-cured out of these formulations. The refractive index at room temperature and 633 nm is shown, together with the elastic modulus.

TABLE 4

| ID | % OFHDDA | % PFCHMMA | modulus (MPa) | refractive index |
|---|---|---|---|---|
| A | 0 | 10 | 43 | 1.3818 |
| B | 0 | 14.9 | 67 | 1.3826 |
| C | 0 | 20 | 39 | 1.3827 |
| D | 0 | 25 | 28 | 1.3832 |
| E | 5 | 10 | 75 | 1.3836 |
| F | 5 | 15 | 76 | |
| G | 5 | 20 | 69 | 1.3844 |
| H | 10 | 10 | 74 | |
| I | 14 | 6 | 86 | |

In formulations A and B, the modulus rises as the concentration of PFCHMMA is increased because this molecule raises the glass transition temperature of the overall formulation. However, further increases in PFCHMMA concentration (formulation C and D) lead to a lower modulus because of the lower crosslink density. One can use a combination of PFCHMMA and OFHDDA (difunctional) to increase the modulus without increasing the refractive index too much. The PFCHMMA contributes a high glass transition temperature, and the OFHDDA increases the crosslink density.

The glass transition temperature of formulation E was measured with a differential scanning calorimeter. The glass transition temperature, defined as the temperature at which the specific heat reaches the midpoint between its value in the glassy state and its value in the rubbery state, was measured to be 57° C. The high room temperature modulus of this material is a consequence of the glass transition being higher than room temperature.

Formulation E has the following physical properties:
a) in the liquid state viscosity: 58,000 cP at 23° C.
b) in the cured state refractive index: 1.3836 at 633 nm and 23° C. glass transition temperature: 57° C. elastic modulus at 23° C. and strain rate of 0.1%/min: 75 MPa elastic modulus at 23° C. and strain rate of 100%/min: 292 MPa elongation at break 30% tensile strength (strain rate of 100%/min): 12.8 MPa

DETAILED DESCRIPTION

Figure 1:
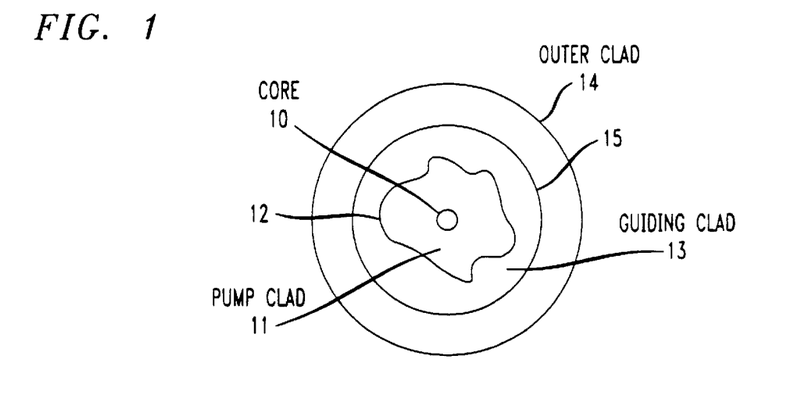
FIG. 1 is a cross-sectional view of a preferred triple-clad structure.

The present invention includes fiber structures having cladding. One possible embodiment includes a double clad structure (FIG. 2) and another embodiment is a triple-clad structure (FIG. 1). The triple clad structure consists of a centrally-positioned single mode core 10 within a multi-mode pump cladding 11. The pump cladding forms an interface 12 with a second cladding 13. Third cladding 14 forms a more nearly circular interface 15 with the second cladding 13.

The triple clad structure was constituted of silica-based glass core, pump clad and a second clad which can be prepared from the present compositions, all enveloped by an organic polymeric coating.

Figure 2:
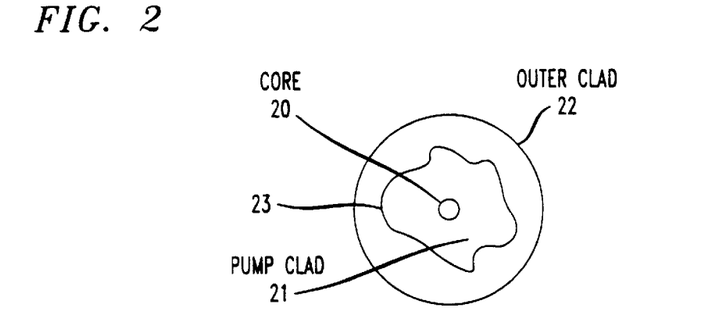
FIG. 2 is a cross-sectional view of a double-clad structure.
Figure 3:
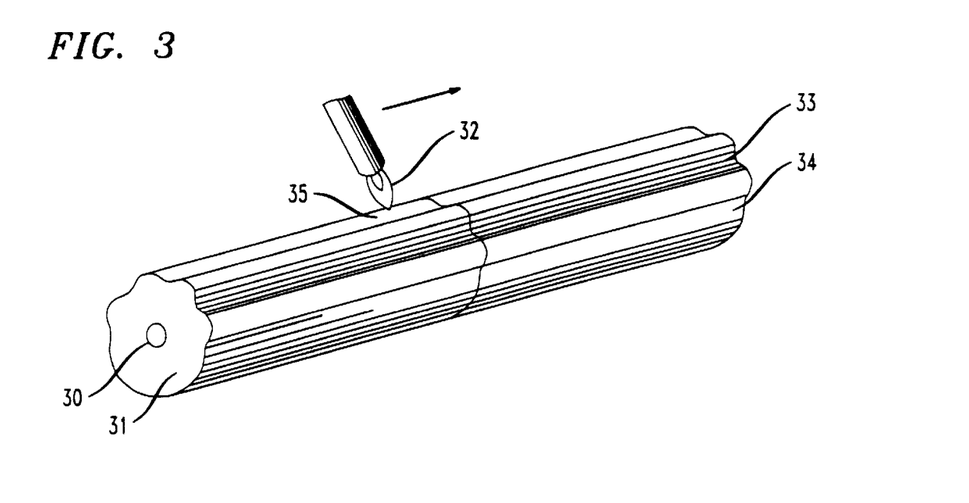
FIG. 3 is a perspective view showing a cladding-pumped device in fabrication.

The double-clad structure of FIG. 2 consists of core 20 and first cladding 21, both generally of silica-based glass, and final polymeric cladding 22, forming interface 23 with the inorganic glass structure. The FIG. 1 structure retains the operating characteristics of FIG. 2, but facilitates cleaving.

A smooth featureless circular interface can also be employed. However, with the shaped interfaces, the probability of non-intersecting mode paths is decreased. Fabrication of that polygonal interface is facilitated by melt processing as described in abandoned U.S. patent application Ser. No. 08/561,682, filed on Nov. 22, 1995.

The structures shown in FIGS. 1 and 2 provide for containment of energy in the pump cladding. In FIG. 1, the function is served by a second cladding layer 13 with the two forming interface 15. Cladding 13 is of a lower refractive index than pump cladding 11.

A glass-polymer interface offers an operating advantage. Its differential index of refraction may be far greater than permitted between silica-rich compositions that differ only in minor dopant content. Fluorinated polymers such as those disclosed herein are used in these structures.

Effective operation of the cladding pumped laser depends on collection area. In the double clad structure, the outer cladding serves for accepting and transferring introduced energy into the pump clad, and is a part of the collection area.

A preferred structural embodiment has an outer surface approaching that of the smooth featureless surface of transmission fiber. The cladding surround the pump-cladding (the second cladding) is desirably of sufficient thickness to accommodate undulations in the outer surface of the pump-cladding. To achieve this purpose, this second cladding is necessarily of thickness somewhat greater than the difference between the radially measured minimum and maximum thickness of this cladding. The polymer cladding of the invention serves a guiding function as well as a protective function.

Large total cross-sectional area of combined glass claddings is always desired for collection efficiency. For the usual single-mode core, and for the total cross-sectional area of a conventional 125–150 μm diameter communication fiber, the clad/core ratio of cross-sectional areas is generally in the range of 100–300. Usually the limiting criterion, splicing expediency is not significantly impaired by same size mismatch. The cladding-pumped structure may be double that of the fiber to be spliced.

Figure 4:
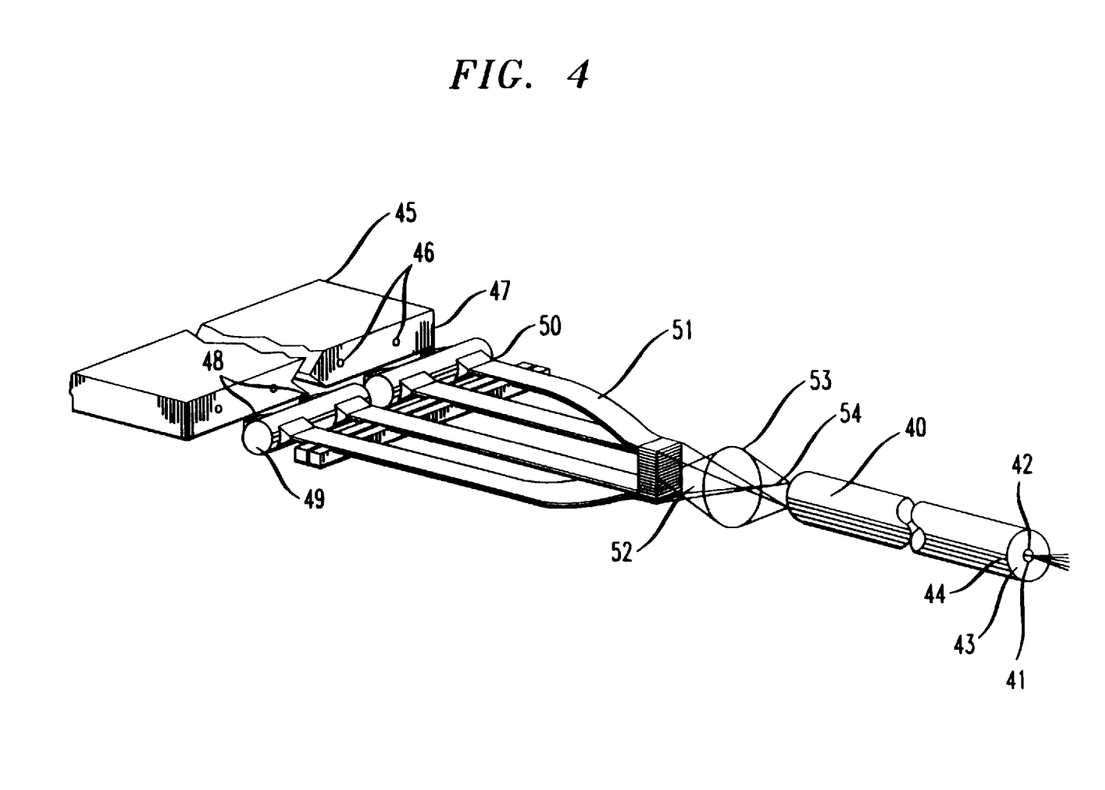
FIG. 4 is a perspective view showing a cladding pump structure coupled to a diode array.

FIG. 4 taken from U.S. Pat. No. 5,268,978, but substituting a preferred trough-containing structure, shows an arrangement for coupling with a diode array. The cladding pump structure 40 is triple-clad and is constituted of core 41, pump clad 42, second clad 43, and third clad 44. The energy source for pumping structure 40 is a diode array 45 consisting of four diodes 46 within a suitable encapsulant 47. Diode radiation is depicted as cones 48, collected by cylindrical lens 49. Focused radiation 50 is made incident on guides 51 which are bundled to yield a cone 52 of emanating radiation, which is focused by convex lens 53 to form beam 54 directed to structure 40.

EXAMPLE 10

Several kilometers of silica fiber were drawn and coated with formulation E described in Example (9). The glass diameter was 125 micrometers; the coated fiber diameter was 250 micrometers. The optical attenuation on this polymer-clad fiber was less than 5 dB/km at 800 nm.

EXAMPLE 11

Figure 5:
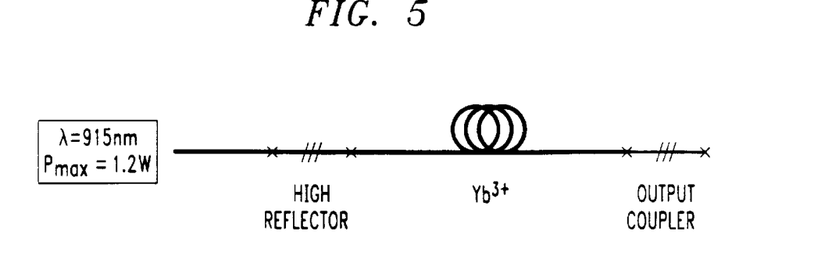
FIG. 5 illustrates a cladding-pumped fiber laser spliced to a high reflector on one end and an output coupler on the other end.
Figure 6:
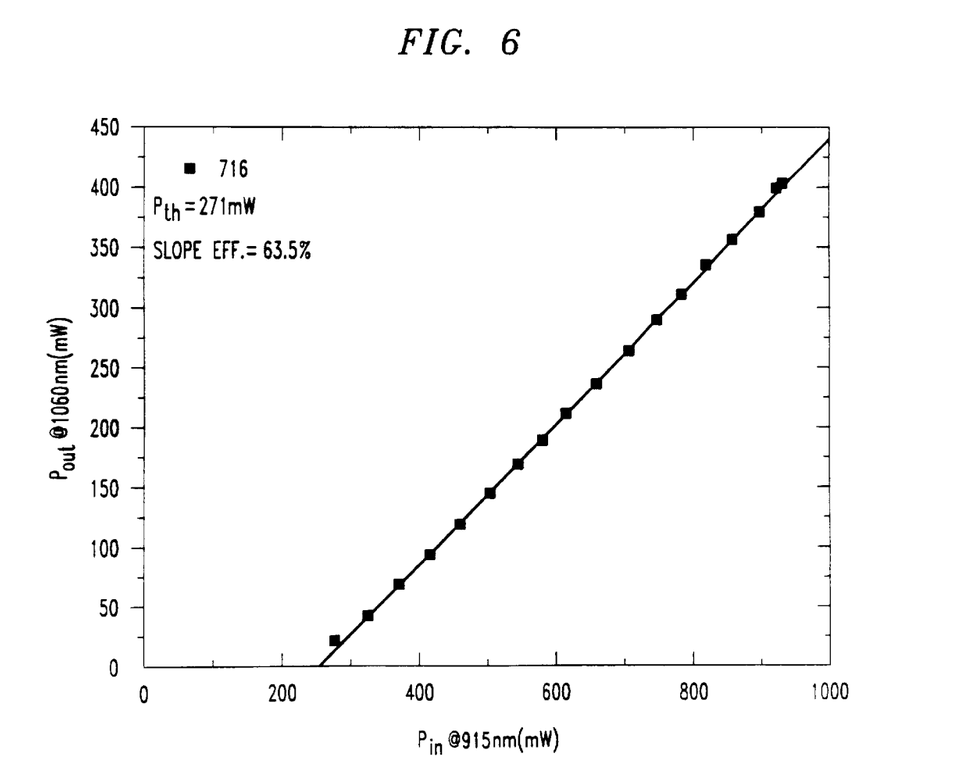
FIG. 6 shows fiber laser output power as a function of input pump power.

Several kilometers of optical fiber were drawn using the coating formulation E. The structure of the fiber consisted of a silica core (diameter 6 μm) doped with ytterbium, a silica cladding with a "star" shape (as described in abandoned U.S. patent application Ser. No. 08/561,682) and an average diameter of 130 μm, and the cured polymer outer cladding (consisting of formulation E) with an outer diameter of 250 μm. This double clad fiber is very robust and handleable. (See FIG. 2). A cladding-pumped fiber laser was built with this fiber. A few tens of meters of this fiber were made into a laser by splicing a high reflector on one end and an output coupler on the other end. The high reflector in turn was spliced to the output of a 1.2 W laser diode (FIG. 5). The device worked very well, showing a slope efficiency of 63.5% (definition of slope efficiency—the efficiency with which pump radiation can be absorbed and converted to useful laser light by the active material and, in particular, the active material in the fiber core). FIG. 6 shows the output power of the fiber laser at 1060 nm as a function of the input pump power at 915 nm.

All of the citations referred to in this application including technical articles, foreign and U.S. patents and U.S. patent application are expressly incorporated by reference into the present application.

The present invention has been described in some detail by way of illustration and example for purposes of clarity of understanding. It will be evident to those skilled in the art that certain changes and modifications may be practiced without departing from the spirit and scope of the present invention as described in the specification and as defined in the appended claims.

What is claimed:

1. A clad optical fiber comprising a core and a cladding made of a material having a refractive index smaller than that of the core, wherein the cladding is made of a cured material comprising a perfluoropolyether or perfluorohydrocarbon backbone end capped with (meth)acrylate groups via urethane groups.

2. The clad optical fiber of claim 1, wherein the cured material is derived from a fluorinated diol having repeating ether groups.

3. The clad optical fiber of claim 2, wherein the cured material is derived from the reaction of the fluorinated diol with a diisocyanate and a hydroxy-containing mono-, di, or poly(meth)acrylate.

4. The clad optical fiber according to claim 3, wherein the hydroxyl group-containing(meth)acrylate is
$CH_2=CH-C(O)O-CH_2CH_2OH$,
$CH_2=CH-C(O)O-CH_2CH(CH_3)OH$,
$CH_2=CH-C(O)O-CH_2CH_2CH_2CH_2OH$,
$CH_2=CH-C(O)O-CH_2CH(CH_2CH_3)OH$,
$CH_2=CH-C(O)O-CH_2CH_2O-[C(O)(CH_2)_5-O-]_2-H$,
$[CH_2=CH-C(O)O-[CH_2CH_2O]_n-H,]$ or
$[[CH_2=CH-C(O)O-CH_2]_3C-OH.]$
$CH_2=CH-C(O)O-CH_2]_3C-CH_2OH$.

5. The clad optical fiber of claim 1, wherein the cured material is obtained from a mixture of the urethane group containing (meth)acrylate and a photoinitiator.

6. The clad optical fiber of claim 5, wherein the cured material is obtained from a mixture comprising from 30–100% by weight of the urethane group-containing (meth)acrylate, up to about 70 weight % of fluorinated (meth)acrylate monomer or mixtures of monomers, and up to about 50% by wt. of a di- or multi-functional (meth)acrylate which is optionally fluorinated or mixtures thereof.

7. The clad optical fiber of claim 6, wherein the cured material is obtained from a mixture comprising 65%–95% by weight of the urethane group-containing (meth)acrylate, up to 35% of fluorinated (meth)acrylate monomer or mixtures of monomers, and up to 35% of a di- or multi-functional (meth)acrylate which is optionally fluorinated or mixtures thereof.

8. The clad optical fiber according to claim 1, wherein the cured material is obtained from an oligomer having the formula

X—O—C(O)—NH—R$^1$—NH—C(O)—R$^2$—C(O)—NH—R$^3$—NH—C(O)—O—Y where X and Y are independently or v is an integer from 1 to 10, r is an integer from 1 to 10, and $1 \leq t \leq 3$;

$R^1$ and $R^3$ are independently, linear, branched or cyclic alkylene of from four to twenty carbon atoms that may be optionally substituted or $R^1$ and $R^3$ independently are optionally substituted arylene groups;

$R^2$ is a fluorinated carbon-based chain with a fluorine content between about 25% and about 70% by weight and

$R^4$, $R^5$, $R^6$, $R^7$ and $R^8$ are independently hydrogen, methyl, ethyl or propyl.

9. The clad optical fiber according to claim 8, wherein $R^2$ is a fluorinated ether with the structure
—O(CH$_2$—CH$_2$—O)$_n$—(CF$_2$—CF$_2$—O)$_p$—(CF$_2$—O)$_q$—(CH$_2$—CH$_2$—O)$_n$—
—O(CH$_2$CH$_2$O)$_n$CH$_2$CF$_2$O(CF$_2$CF$_2$O)$_p$(CF$_2$O)$_q$CF$_2$CH$_2$O(CH$_2$CH$_2$O)$_n$—
—CH$_2$CF$_2$O(CF$_2$CF$_2$O)$_p$(CF$_2$O)$_q$CF$_2$CH$_2$O—
—{OCH$_2$CF(CF$_3$)O[CF(CF$_3$)CF$_2$O]$_2$C$_2$F$_4$}$_2$ and
—O CH$_2$CH(OH)CH$_2$OCH$_2$CF$_2$O(CF$_2$CF$_2$O)$_p$(CF$_2$O)$_q$CF$_2$CH$_2$CH(OH)CH$_2$O——O—CH$_2$—(CF$_2$)$_i$—CH$_2$—O— in which $3 \leq i \leq 20$ where $0 \leq n \leq 5$, $0.2 \leq p/q \leq 5$, and the actual values of p and q are such that the molecular weight of $R^2$ is between 500 and 10,000; wherein the repeating fluorinated ether groups may be random or block repeating units.

10. The clad optical fiber according to claim 9, wherein both X and Y are

$R^1$ and $R^3$ are the isophorone residue; the molecular weight of $R^2$ is between 1,300 and 3,300; the average value of n is between 1 and 3 and $0.8 \leq p/q \leq 1.25$.

11. The clad optical fiber according to claim 9, wherein the cured material is prepared from a fluorinated diol which is
HO(CH$_2$CH$_2$O)$_n$(CF$_2$CF$_2$O)$_p$(CF$_2$O)$_q$(CH$_2$CH$_2$O)$_n$H,
HO(CH$_2$CH$_2$O)$_n$CH$_2$CF$_2$O(CF$_2$CF$_2$O)$_p$(CF$_2$O)$_q$CF$_2$CH$_2$O(CH$_2$CH$_2$O)$_n$H,
HO CH$_2$CF$_2$O(CF$_2$CF$_2$O)$_p$(CF$_2$O)$_q$CF$_2$CH$_2$OH,
HO CH$_2$CH (OH)CH$_2$OCH$_2$CF$_2$O(CF$_2$CF$_2$O)$_p$(CF$_2$O)$_q$CF$_2$CH$_2$CH(OH)CH$_2$OH, or
{HOCH$_2$CF(CF$_3$)O[CF(CF$_3$)CF$_2$O]$_2$C$_2$F$_4$}$_2$.

12. The clad optical fiber according to claim 9, wherein the fluorinated (meth)acrylate monomer is a fluorinated rigid molecule with (meth)acrylate functionality.

13. The clad optical fiber according to claim 12, wherein the rigid (meth)acrylate is perfluorocyclohexylmethyl methacrylate;
pentafluorobenzyl(meth)acrylate;
pentafluorophenyl(meth)acrylate;
perfluoronorbornylmethyl(meth)acrylate;
1H-perfluoroisobornyl(meth)acrylate;

17

-continued

14. The clad optical fiber according to claim 12 wherein the difunctional (meth) acrylates include:
2,2,3,3,4,4,5,5-octafluorohexanediol-1,6-diacrylate;
perfluorocyclohexyl-1,4-dimethyl diacrylate;
polyperfluoroethyleneglycol diacrylate;
2,2,3,3-tetrafluoro-1,4 butanediol diacrylate;
hexafluoropentandiyl-1-5 bis(acrylate);
hexafluorobisphenol "A" diacrylate;
$CH_2=CHC(O)OCH_2CF_2O(CF_2CF_2O)_p(CF_2O)_q CF_2CH_2OC(O)CH=CH_2$; or
$\{CH_2=CHC(O)OCH_2CF(CF_3)O[CF(CF_3)CF_2O]_2C_2F_4\}_2$.

15. The clad optical fiber according to claim 9 wherein the difunctional (meth) acrylates include:
2,2,3,3,4,4,5,5-octafluorohexanediol-1,6-diacrylate;
perfluorocyclohexyl-1,4-dimethyl diacrylate;
polyperfluoroethyleneglycol diacrylate;
2,2,3,3-tetrafluoro-1,4 butanediol diacrylate;
hexafluoropentandiyl-1-5 bis(acrylate);
hexafluorobisphenol "A" diacrylate;
$CH_2=CHC(O)OCH_2CF_2O(CF_2CF_2O)_p(CF_2O)_q CF_2CH_2OC(O)CH=CH_2$; or
$\{CH_2=CHC(O)OCH_2CF(CF_3)O[CF(CF_3)CF_2O]_2C_2F_4\}_2$.

16. The clad optical fiber according to claim 1, wherein the clad fiber is prepared by coating the optical fiber with a layer comprising the perfluoropolyether or perfluorohydrocarbon backbone end capped with (meth)acrylate groups via urethane groups and a photopolymerization initiator and curing the layer of the optical fiber.

17. The clad optical fiber according to claim 16, wherein the layer is cured by exposing the layer to radiation.

18. The clad fiber of claim 1, wherein up to 50% of the backbone ends are end-capped with alkoxysilane groups with the balance being end-capped with meth(acrylate) groups.

19. A composition useful for making a clad optical fiber wherein the composition has a refractive index smaller than that of a core of the optical fiber and wherein the composition comprises a perfluoropolyether or perfluorohydrocarbon backbone end capped with (meth)acrylate groups via urethane groups and a photopolymerization initiator.

20. The composition of claim 19, wherein the composition is derived from a fluorinated diol having repeating ether groups.

21. The composition of claim 20, wherein the composition is derived from the reaction of the fluorinated diol with a diisocyanate and a hydroxy-containing mono-, di, or poly(meth)acrylate.

22. An apparatus comprising a fiber including a core of size and transparency for transmitting electromagnetic wave energy of a first wavelength, the core being encompassed within a contacting pump cladding for receiving and transferring pump energy to the core, the pump cladding forming an interface with an enveloping second cladding, the improvement wherein the second cladding is derived from the composition of claim 21.

23. An apparatus comprising a fiber including a core of size and transparency for transmitting electromagnetic wave energy of a first wavelength, the core being encompassed within a contacting pump cladding for receiving and transferring pump energy to the core, the pump cladding forming an interface with an enveloping second cladding, the improvement wherein the second cladding is derived from the composition of claim 20.

24. The composition of claim 19, wherein the composition comprises from 30–100% by weight of the urethane group-containing (meth)acrylate, up to about 70 weight % of fluorinated (meth)acrylate monomer or mixtures of monomers, and up to about 50% by wt. of a di- or multifunctional (meth)acrylate which is optionally fluorinated or mixtures thereof.

25. The composition according to claim 24, wherein the (meth)acrylate monomer is a fluorinated rigid molecule with (meth)acrylate functionality.

26. An apparatus comprising a fiber including a core of size and transparency for transmitting electromagnetic wave energy of a first wavelength, the core being encompassed within a contacting pump cladding for receiving and transferring pump energy to the core, the pump cladding forming an interface with an enveloping second cladding, the improvement wherein the second cladding is derived from the composition of claim 25.

27. The composition according to claim 25, wherein the rigid (meth)acrylate is perfluorocyclohexylmethyl methacrylate;
pentafluorobenzyl(meth)acrylate;
pentafluorophenyl(meth)acrylate;
perfluoronorbornylmethyl(meth)acrylate;
1H-perfluoroisobornyl(meth)acrylate;

28. An apparatus comprising a fiber including a core of size and transparency for transmitting electromagnetic wave energy of a first wavelength, the core being encompassed within a contacting pump cladding for receiving and transferring pump energy to the core, the pump cladding forming an interface with an enveloping second cladding, the improvement wherein the second cladding is derived from the composition of claim 27.

29. An apparatus comprising a fiber including a core of size and transparency for transmitting electromagnetic wave energy of a first wavelength, the core being encompassed within a contacting pump cladding for receiving and transferring pump energy to the core, the pump cladding forming an interface with an enveloping second cladding, the improvement wherein the second cladding is derived from the composition of claim 24.

30. The composition of claim 24 wherein the composition comprises 65%–95% by weight of the urethane group-containing (meth)acrylate, up to 35% of fluorinated (meth) acrylate monomer or mixtures of monomers, and up to 35% of a di- or multi-functional (meth)acrylate which is optionally fluorinated or mixtures thereof.

31. The composition of claim 19, wherein the composition is obtained from an oligomer having the formula

X—O—C(O)—NH—R$^1$—NH—C(O)—R$^2$—C(O)—NH—R$^3$—NH—C(O)—O—Y where X and Y are independently v is an integer from 1 to 10, r is an integer from 1 to 10, and $1 \leq t \leq 3$;

R$^1$ and R$^3$ are independently, linear, branched or cyclic alkylene of from four to twenty carbon atoms that may be optionally substituted or R$^1$ and R$^3$ independently are optionally substituted arylene groups;

R$^2$ is a fluorinated carbon-based chain with a fluorine content between about 25% and about 70% by weight and R$^4$, R$^5$, R$^6$, R$^7$ and R$^8$ are independently hydrogen, methyl, ethyl or propyl.

32. The composition of claim 31, wherein R$^2$ is a fluorinated ether with the structure

—O(CH$_2$—CH$_2$—O)$_n$—(CF$_2$—CF$_2$—O)$_p$—(CF$_2$—O)$_q$—(CH$_2$—CH$_2$—O)$_n$—;
—O(CH$_2$CH$_2$O)$_n$CH$_2$CF$_2$O(CF$_2$CF$_2$O)$_p$(CF$_2$O)$_q$CF$_2$CH$_2$O(CH$_2$CH$_2$O)$_n$—;
—CH$_2$CF$_2$O(CF$_2$CF$_2$O)$_p$(CF$_2$O)$_q$CF$_2$CH$_2$O—;
—{OCH$_2$CF(CF$_3$)O[CF(CF$_3$)CF$_2$O]$_2$C$_2$F$_4$}$_2$ or

—O CH$_2$CH(OH)CH$_2$OCH$_2$CF$_2$O(CF$_2$CF$_2$O)$_p$(CF$_2$O)$_q$ CF$_2$CH$_2$CH(OH)CH$_2$O—
—O—CH$_2$—(CF$_2$)$_i$—CH$_2$—O— in which $3 \leq i \leq 20$ where $0 \leq n \leq 5$, $0.2 \leq p/q \leq 5$, and the actual values of p and q are such that the molecular weight of R$^2$ is between 500 and 10,000; wherein the repeating fluorinated ether groups may be random or block repeating unit.

33. The composition according to claim 32, wherein both X and Y are

R$^1$ and R$^3$ are the isophorone residue; the molecular weight of R$^2$ is between 1,300 and 3,300; the average value of n is between 1 and 3 and $0.8 \leq p/q \leq 1.25$.

34. An apparatus comprising a fiber including a core of size and transparency for transmitting electromagnetic wave energy of a first wavelength, the core being encompassed within a contacting pump cladding for receiving and transferring pump energy to the core, the pump cladding forming an interface with an enveloping second cladding, the improvement wherein the second cladding is derived from the composition of claim 33.

35. The composition according to claim 32, wherein the composition is prepared from a fluorinated diol which is
HO(CH$_2$CH$_2$O)$_n$(CF$_2$CF$_2$O)$_p$(CF$_2$O)$_q$(CH$_2$CH$_2$O)$_n$H,
HO(CH$_2$CH$_2$O)$_n$CH$_2$CF$_2$O(CF$_2$CF$_2$O)$_p$(CF$_2$O)$_q$CF$_2$CH$_2$O(CH$_2$CH$_2$O)$_n$H,
HO CH$_2$CF$_2$O(CF$_2$CF$_2$O)$_p$(CF$_2$O)$_q$CF$_2$CH$_2$OH,
HO CH$_2$CH (OH)CH$_2$OCH$_2$CF$_2$O(CF$_2$CF$_2$O)$_p$(CF$_2$O)$_q$CF$_2$CH$_2$CH(OH)CH$_2$OH, or
{HOCH$_2$CF(CF$_3$)O[CF(CF$_3$)CF$_2$O]$_2$C$_2$F$_4$}$_2$.

36. An apparatus comprising a fiber including a core of size and transparency for transmitting electromagnetic wave energy of a first wavelength, the core being encompassed within a contacting pump cladding for receiving and transferring pump energy to the core, the pump cladding forming an interface with an enveloping second cladding, the improvement wherein the second cladding is derived from the composition of claim 35.

37. An apparatus comprising a fiber including a core of size and transparency for transmitting electromagnetic wave energy of a first wavelength, the core being encompassed within a contacting pump cladding for receiving and transferring pump energy to the core, the pump cladding forming an interface with an enveloping second cladding, the improvement wherein the second cladding is derived from the composition of claim 32.

38. The composition according to claim 31, wherein the (meth)acrylate is hydroxyl group-containing CH$_2$=CH—C(O)O—CH$_2$CH$_2$OH,
CH$_2$=CH—C(O)O—CH$_2$CH(CH$_3$) OH,
CH$_2$=CH—C(O) O—CH$_2$CH$_2$CH$_2$CH$_2$OH,
CH$_2$=CH—C(O)O—CH$_2$CH(CH$_2$CH$_3$) OH,
CH$_2$=CH—C(O)O—CH$_2$CH$_2$O—[C(O)(CH$_2$)$_5$—O—]$_2$—H,
[CH$_2$=CH—C(O)O—[CH$_2$CH$_2$O]$_n$—H,] or
[[CH$_2$=CH—C(O)O—CH$_2$]$_3$C—OH.]
[CH$_2$=CH—C(O)O—CH$_2$]$_3$C—CH$_2$OH.

39. An apparatus comprising a fiber including a core of size and transparency for transmitting electromagnetic wave energy of a first wavelength, the core being encompassed within a contacting pump cladding for receiving and transferring pump energy to the core, the pump cladding forming an interface with an enveloping second cladding, the improvement wherein the second cladding is derived from the composition of claim 38.

40. An apparatus comprising a fiber including a core of size and transparency for transmitting electromagnetic wave energy of a first wavelength, the core being encompassed within a contacting pump cladding for receiving and transferring pump energy to the core, the pump cladding forming an interface with an enveloping second cladding, the improvement wherein the second cladding is derived from the composition of claim 31.

41. An apparatus comprising a fiber including a core of size and transparency for transmitting electromagnetic wave energy of a first wavelength, the core being encompassed within a contacting pump cladding for receiving and transferring pump energy to the core, the pump cladding forming an interface with an enveloping second cladding, the improvement wherein the second cladding is derived from the composition of claim 19.

42. Apparatus of claim 41, in which the core is rare-earth doped, in which transferred energy pumps rare earth in the core to an excited state which upon relaxation emits output radiation of the first wavelength.

43. Apparatus of claim 42 which performs the function of a laser.

44. Apparatus of claim 42 in which the core contains erbium, ytterbium or neodymium.

45. Apparatus of claim 42 in which the core contains erbium and ytterbium.

46. Apparatus according to claim 41, wherein both core and pump cladding are comprised of silica-rich glass.

47. A composition useful for making a clad optical fiber wherein the composition has a refractive index smaller than that of a core of the fiber and wherein the composition is photocurable or E-beam curable and has a viscosity of between about 1000 and 100,000 cP at 23° C., a refractive index of the cured material lower than 1.390 (at 633 nm and 23° C.); a glass transition temperature greater than 30° C.; an elastic modulus at 23° C. greater than 30 MPa (measured at a strain rate of 0.1%/min) or greater than 120 MPa (measured at a strain rate of 100%/min); an elongation at break greater than 20%; and a tensile strength greater than 8 MPa (at 100%/min).

48. A clad optical fiber comprising a core of glass and a cladding made of the composition according to claim 47.

49. An apparatus comprising a fiber including a core of size and transparency for transmitting electromagnetic wave energy of a first wavelength, the core being encompassed within a contacting pump cladding for receiving and transferring pump energy to the core, the pump cladding forming an interface with an enveloping second cladding, the improvement wherein the second cladding is derived from the composition of claim 47.

* * * * *